US011204072B2

(12) United States Patent
Carminati

(10) Patent No.: US 11,204,072 B2
(45) Date of Patent: Dec. 21, 2021

(54) DISC BRAKE DISC WITH PARKING BRAKE CYLINDRICAL SURFACE

(71) Applicant: FRENI BREMBO S.P.A., Curno (IT)

(72) Inventor: Fabiano Carminati, Curno (IT)

(73) Assignee: Freni Brembo, S.p.A., Bergamo (IT)

(*) Notice: Subject to any disclaimer, the term of this patent is extended or adjusted under 35 U.S.C. 154(b) by 200 days.

(21) Appl. No.: 16/488,738

(22) PCT Filed: Feb. 23, 2018

(86) PCT No.: PCT/IB2018/051132
§ 371 (c)(1),
(2) Date: Aug. 26, 2019

(87) PCT Pub. No.: WO2018/154496
PCT Pub. Date: Aug. 30, 2018

(65) Prior Publication Data
US 2020/0049214 A1    Feb. 13, 2020

(30) Foreign Application Priority Data

Feb. 27, 2017  (IT) .......................... 102017000021875

(51) Int. Cl.
*F16D 65/12*      (2006.01)
*F16D 65/06*      (2006.01)
*F16D 65/02*      (2006.01)

(52) U.S. Cl.
CPC .......... *F16D 65/123* (2013.01); *F16D 65/067* (2013.01); *F16D 2065/1384* (2013.01)

(58) Field of Classification Search
CPC ................. F16D 65/123; F16D 65/067; F16D 2065/1384
See application file for complete search history.

(56) References Cited

U.S. PATENT DOCUMENTS

| 9,309,939 B2 | 4/2016 | Hentrich et al. |
| 9,441,688 B2 | 9/2016 | Isenmann et al. |

(Continued)

FOREIGN PATENT DOCUMENTS

| DE | 4419754 A1 | 12/1995 |
| DE | 4420758 A1 | 12/1995 |

(Continued)

OTHER PUBLICATIONS

European Patent Office, International Search Report with Written Opinion, completed on May 30, 2018 in PCT/IB2018/051132, 11 pages, European Patent Office, Rijswijk, Netherlands.

*Primary Examiner* — Vishal R Sahni
(74) *Attorney, Agent, or Firm* — Marshall & Melhorn, LLC

(57) ABSTRACT

A disc brake disc with a parking brake cylindrical surface for cooperating with shoes of a parking brake comprises a braking band comprising opposite braking surfaces and a geometric connection portion of band connecting the braking band to a bell; the bell comprising a connection plate with a wheel hub and an annular geometric connection portion of bell for geometric connection of the bell to the geometric connection portion of band; the braking band and the bell being pieces separate from each other and geometrically coupled to each other by geometric connection portions of band and bell so as to transfer a braking action by a brake caliper on the opposite braking surfaces from the braking band to the bell and to the wheel hub; the bell comprising a geometric bell connection surface opposite to said braking band. The disc brake disc further comprises a parking ring comprising radially and internally an inner portion of ring, and radially and externally a geometric ring connection portion.

11 Claims, 8 Drawing Sheets

(56) References Cited

U.S. PATENT DOCUMENTS

| | | |
|---|---|---|
| 9,476,469 B2 | 10/2016 | Gutelius |
| 9,920,804 B2 | 3/2018 | Gutelius |
| 10,458,495 B2 | 10/2019 | Valle |
| 2008/0217116 A1 | 9/2008 | Bonfanti et al. |
| 2014/0151166 A1* | 6/2014 | Tironi .................. F16D 65/123 |
| | | 188/218 XL |
| 2015/0015057 A1* | 1/2015 | Oberti .................. F16D 65/847 |
| | | 301/6.8 |

FOREIGN PATENT DOCUMENTS

| | | |
|---|---|---|
| DE | 102012009659 A1 | 11/2013 |
| GB | 2032546 A | 5/1980 |
| JP | 10119738 * | 5/1998 |
| JP | 2002295544 A | 10/2002 |
| KR | 20150076790 A | 7/2015 |

* cited by examiner

DISC BRAKE DISC WITH PARKING BRAKE CYLINDRICAL SURFACE

FIELD OF THE INVENTION

It is the object of the present invention a disc brake disc with a parking brake cylindrical surface.

In particular, the present invention relates to a disc brake disc with a parking brake cylindrical surface which is adapted to cooperate with clamps, or shoes, of a parking brake.

BACKGROUND ART

As it is known, disc brake discs comprise a bell from which an annular portion, called a braking band, extends, intended to cooperate with caliper pads.

In some types of disc, known as drum-in-hat, the braking band cooperates with a brake caliper arranged straddling thereon and acting with the pads thereof on opposite braking surfaces to exert a service braking action, i.e. adapted to slow or abruptly halt a moving vehicle, while the bell has an inner cylindrical surface on which parking brake shoes cooperate, adapted to cooperate with said cylindrical surface to exert a parking braking action, i.e. an action which is adapted to maintain the vehicle in position when stationary.

A solution of this type is, for example, known from document U.S. Pat. No. 9,476,469 B2 to Akebono Brake ind.

However, in order to simplify the production of brake discs, it is also known making the bell in metal sheet, which is light and easy to produce and to couple with the braking band, while the braking band is made of a material which is resistant to the heat produced by the service braking action, also allowing sudden decelerations of the vehicle on which the disc brake disc is mounted, without this deteriorating. For example, it is known to make braking bands in cast iron and alloys thereof.

Solutions of this type are, for example, known from documents US2014000995 A1, US2014311838 A1, DE102012009659 A1 to Daimler AG and also DE4420758 A1, DE4419754 A1 to ITT Automotive Europe GmbH.

These known solutions, however, precisely because they have a metal sheet bell, are not adapted to internally make cylindrical surfaces for receiving parking brake shoes.

In fact, in the disc brake discs of this type, the bell, being in metal sheet shaped to be connected to a hub and to the braking band, is not adapted to constitute a cylindrical surface for shoes of a parking brake, both due to the inherent unreliable irregularity thereof, and to the incapability thereof to support a parking braking action which, by nature, has high and localized magnitude, i.e. remaining for prolonged periods in the same position of the bell, which, being in metal sheet, is likely to deform into unwanted shapes, for example, is likely to ovalize.

Therefore, the need to make a disc brake disc with a parking surface which allows to use metal sheet bells is strongly felt.

Solution

The problem underlying the present invention is that of proposing a disc brake disc with a parking brake cylindrical surface which has structural and functional features such as to satisfy the aforesaid requirement and, at the same time, to overcome the drawbacks complained above with reference to the background art.

Such drawback is overcome by means of a disc brake disc according to claim 1 and a method according to claim 7.

By virtue of the embodiments of the claimed disc brake disc, it is possible to satisfy the aforementioned needs. In particular, by virtue of the proposed solution, the parking force only acts on the parking ring. Thereby, the pressing force of the shoe does not discharge radially on the metal sheet bell, risking to deform it, but remains in the parking ring and then passes to the bell by virtue of the ring connection portion thereof, which is circumferentially extended and circumferentially connected in a uniform manner to the bell, and then, through the bell, discharges into the vehicle hub. In fact, the outer profile of the parking ring couples with the inner profile of the bell and the parking torque passes from the parking ring to the bell, and therefore from the wheel to the hub.

FIGURES

Further features and advantages of the disc brake disc in accordance with the invention will become apparent from the following description of preferred embodiments, given by way of indicative and non-limiting example, with reference to the accompanying Figures, in which.

DESCRIPTION OF SOME PREFERRED EMBODIMENTS

Figure 1:
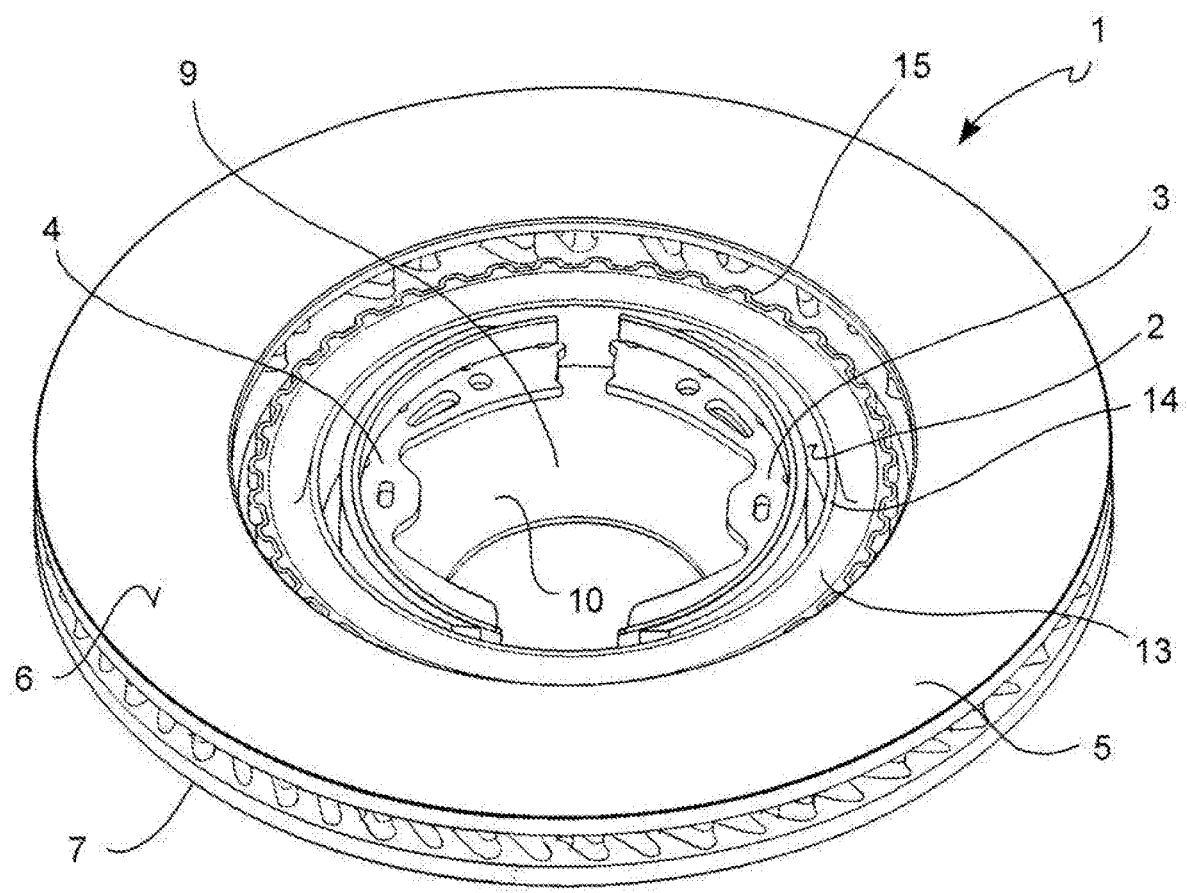
FIG. 1 shows a perspective view of an assembly of a disc brake disc according to the present invention with which two clamps or shoes are associated.
Figure 2:
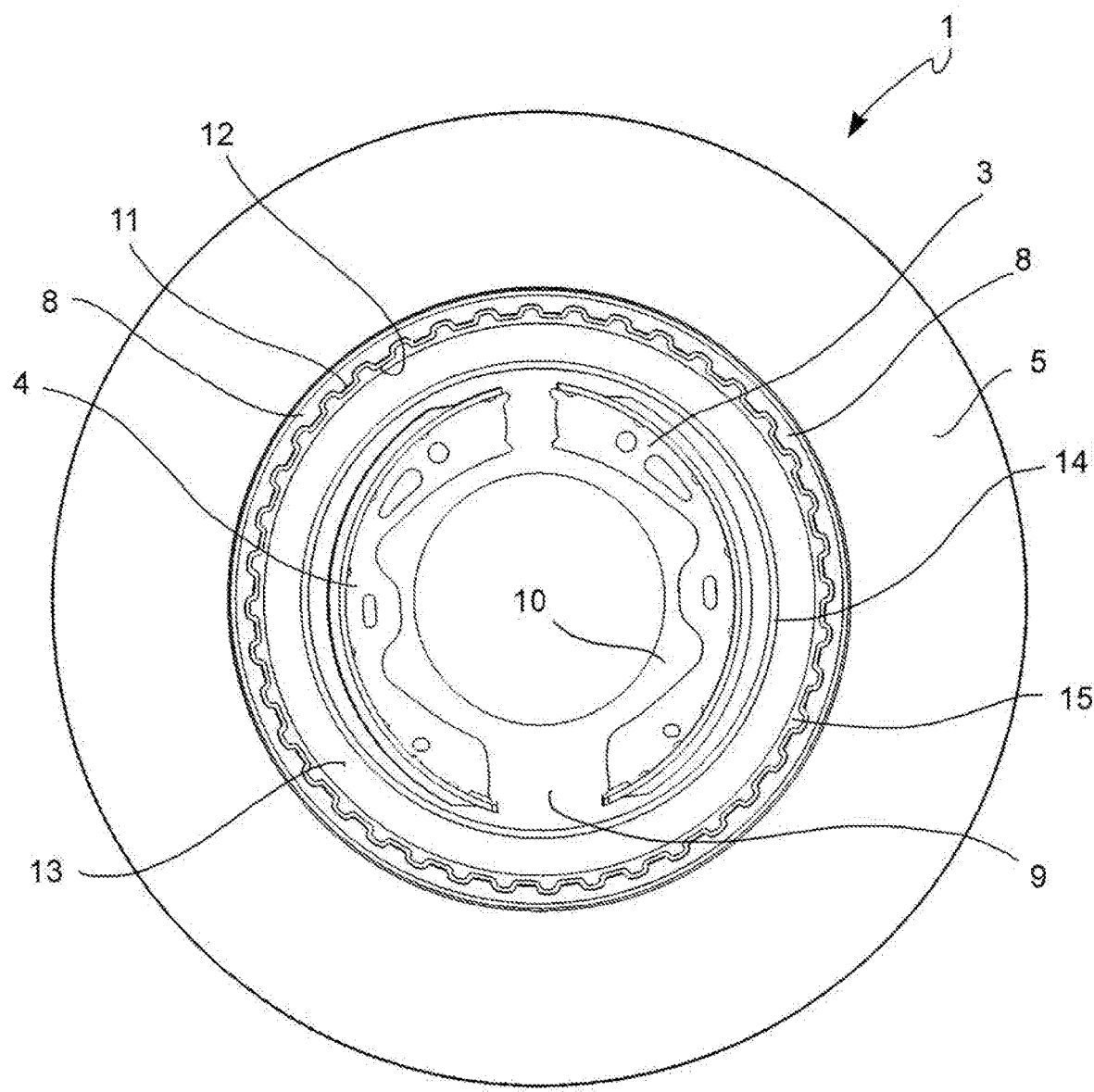
FIG. 2 shows a plan view of the disc brake disc assembly of FIG. 1.
Figure 3:
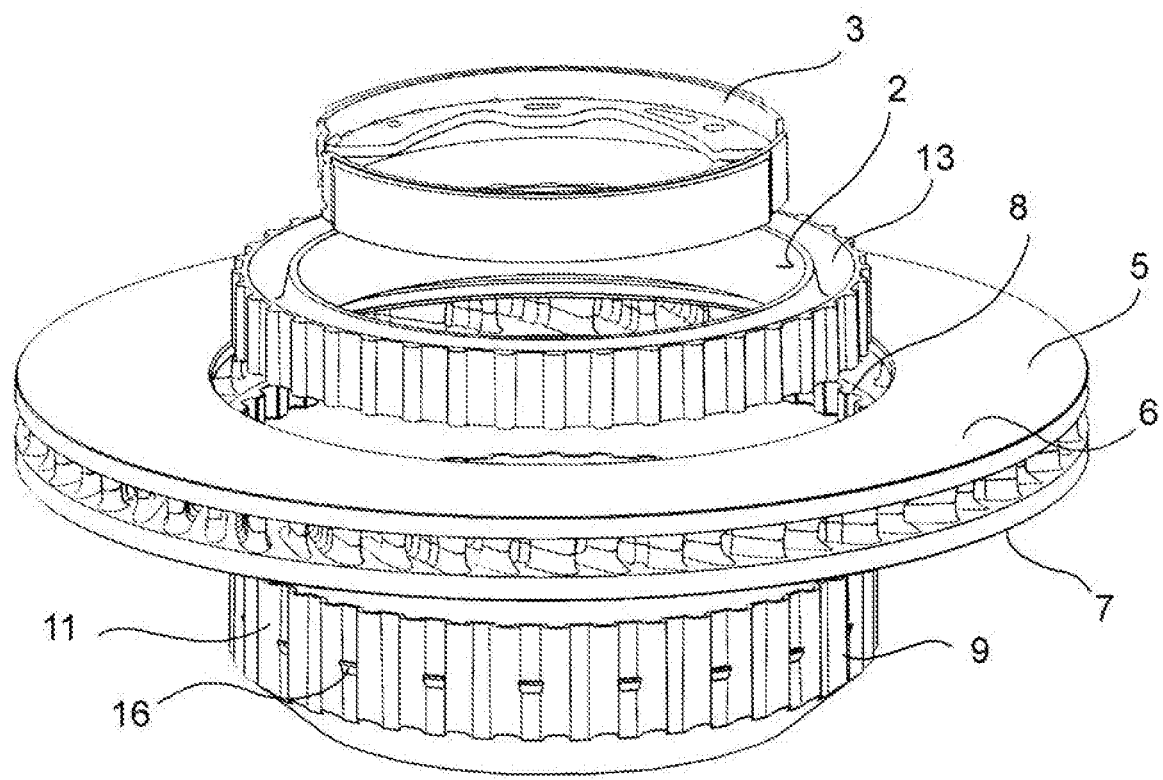
FIG. 3 shows an axonometric view in separate parts of the assembly of FIG. 1.
Figure 4:
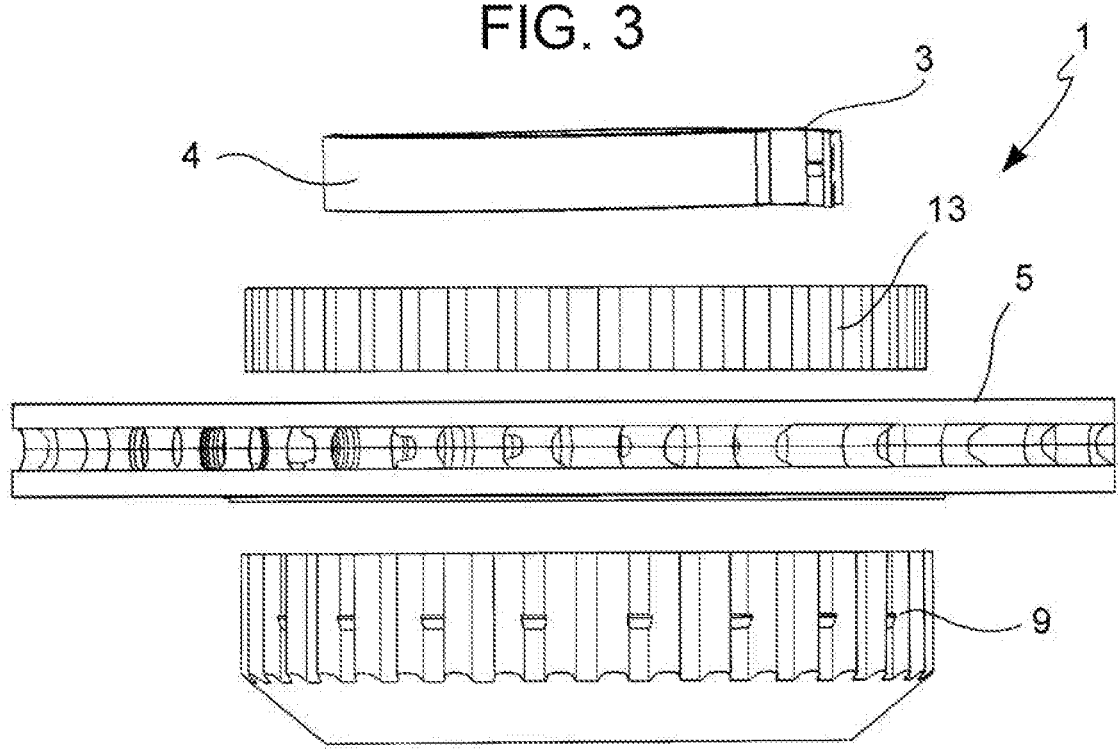
FIG. 4 shows a side view of the assembly in separate parts of FIG. 3.
Figure 5:
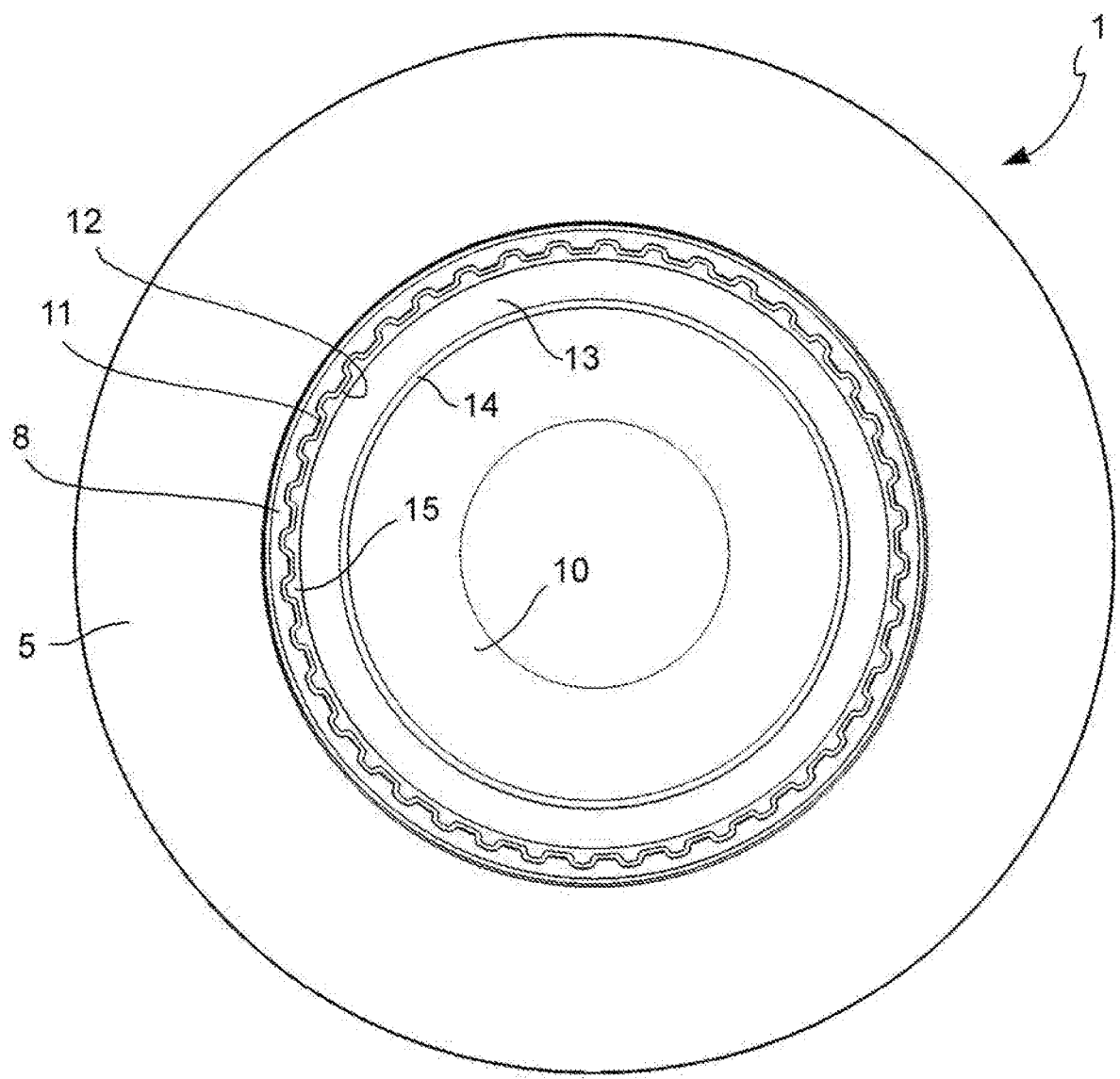
FIG. 5 shows a plan view of a disc brake disc according to the invention.
Figure 6:
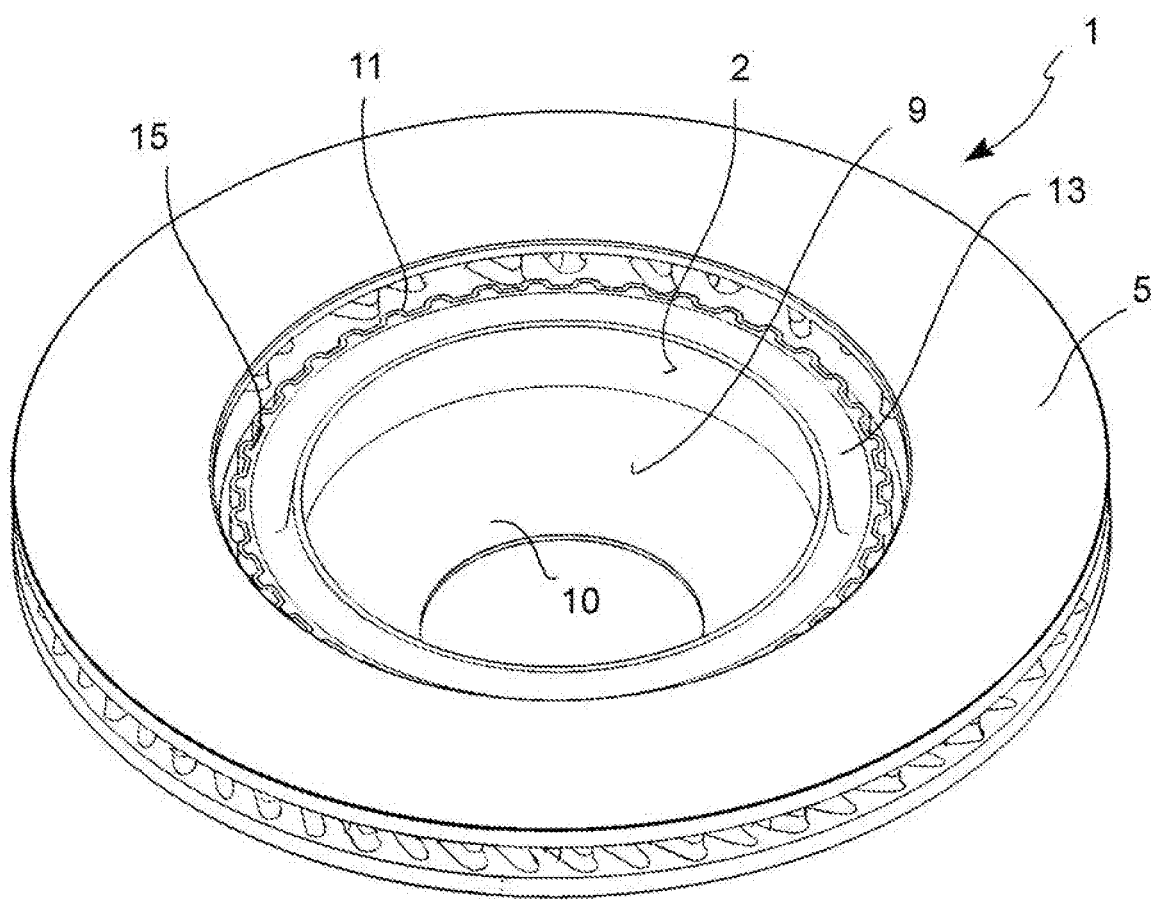
FIG. 6 shows an axonometric view of the disc brake disc of FIG. 5.
Figure 7:
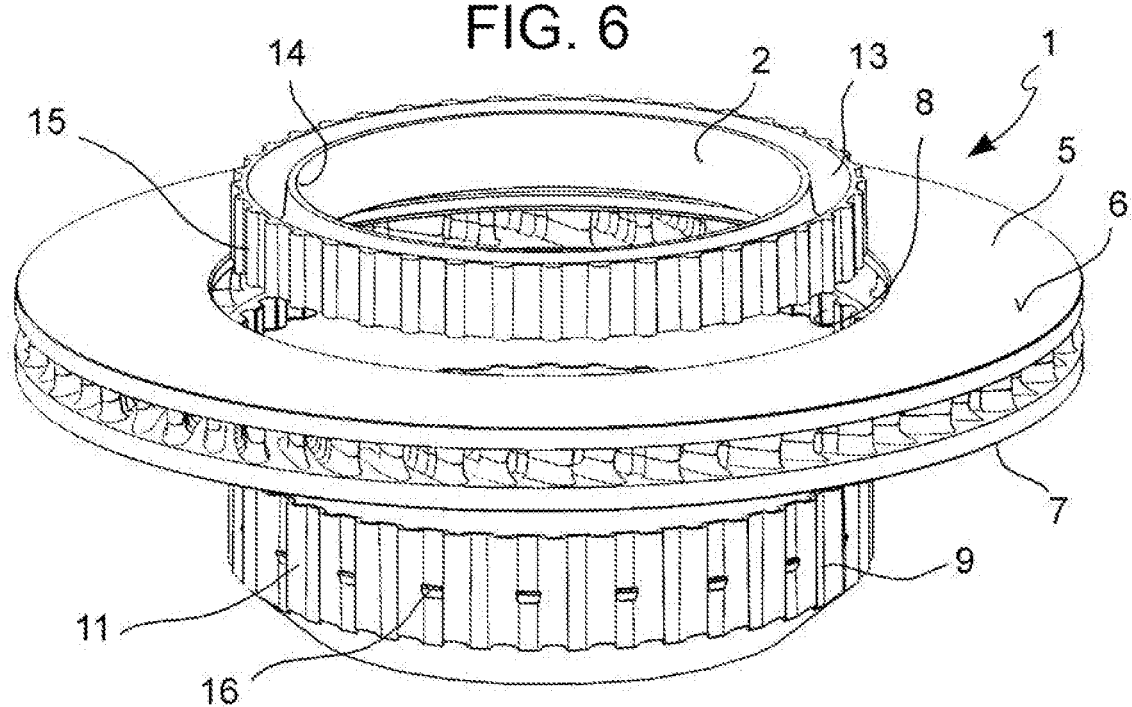
FIG. 7 shows an axonometric view in separate parts of the disc brake disc of FIG. 5.
Figure 8:
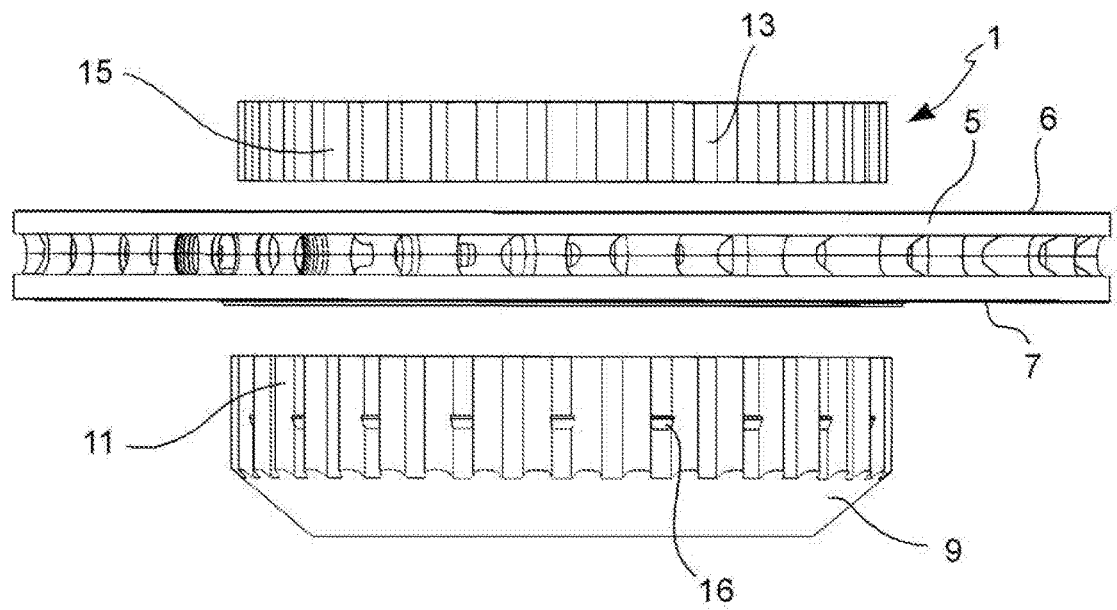
FIG. 8 shows a side view of the disc brake disc of FIG. 7.
Figure 9:
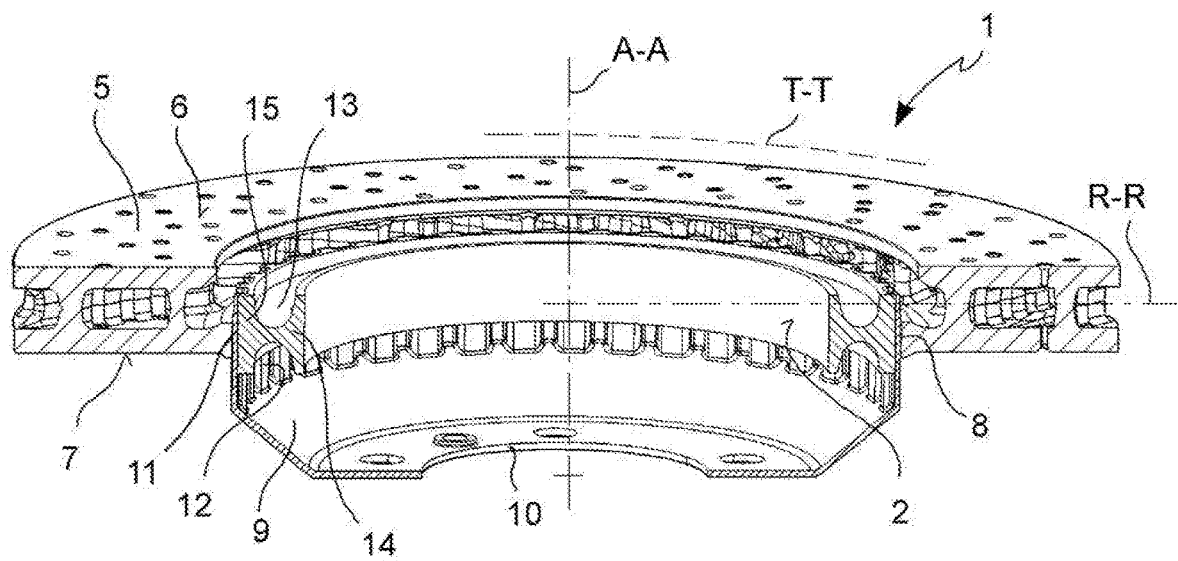
FIG. 9 shows an axonometric view, sectioned along a plane comprising the axis of rotation of the disc and a radial direction, of a disc brake disc according to a further embodiment.
Figure 10:
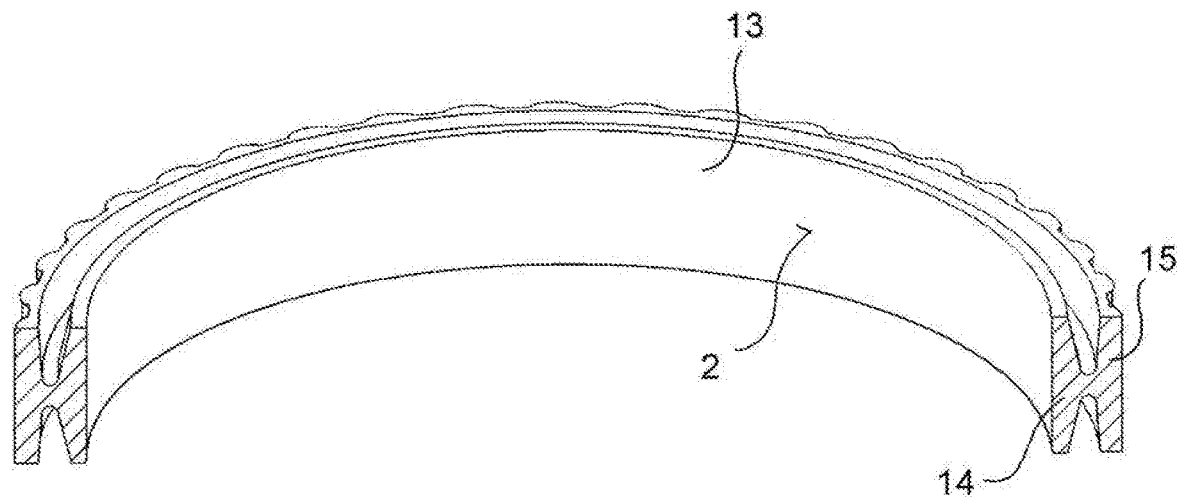
FIG. 10 shows a sectioned axonometric view of a parking ring.
Figure 11:
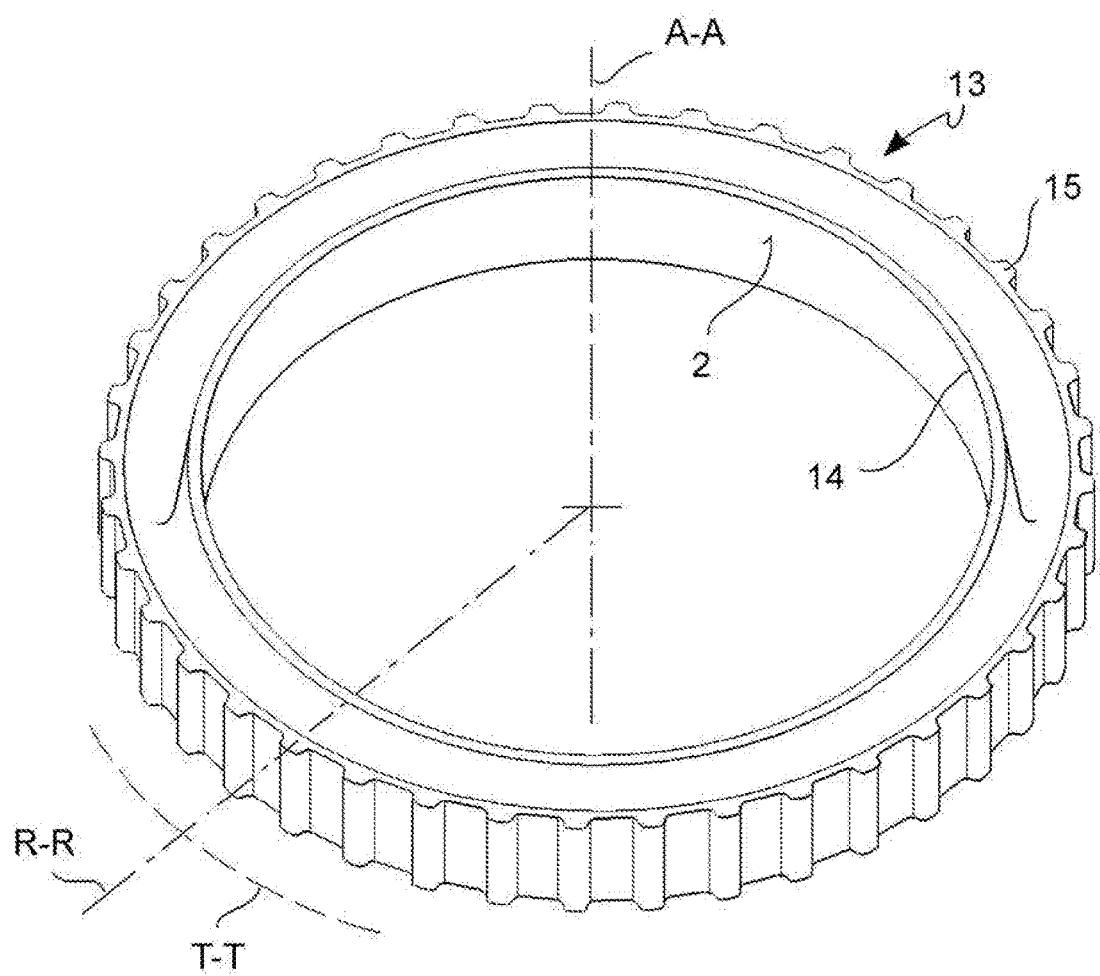
FIG. 11 shows an axonometric view of the ring of FIG. 10.
Figure 12:
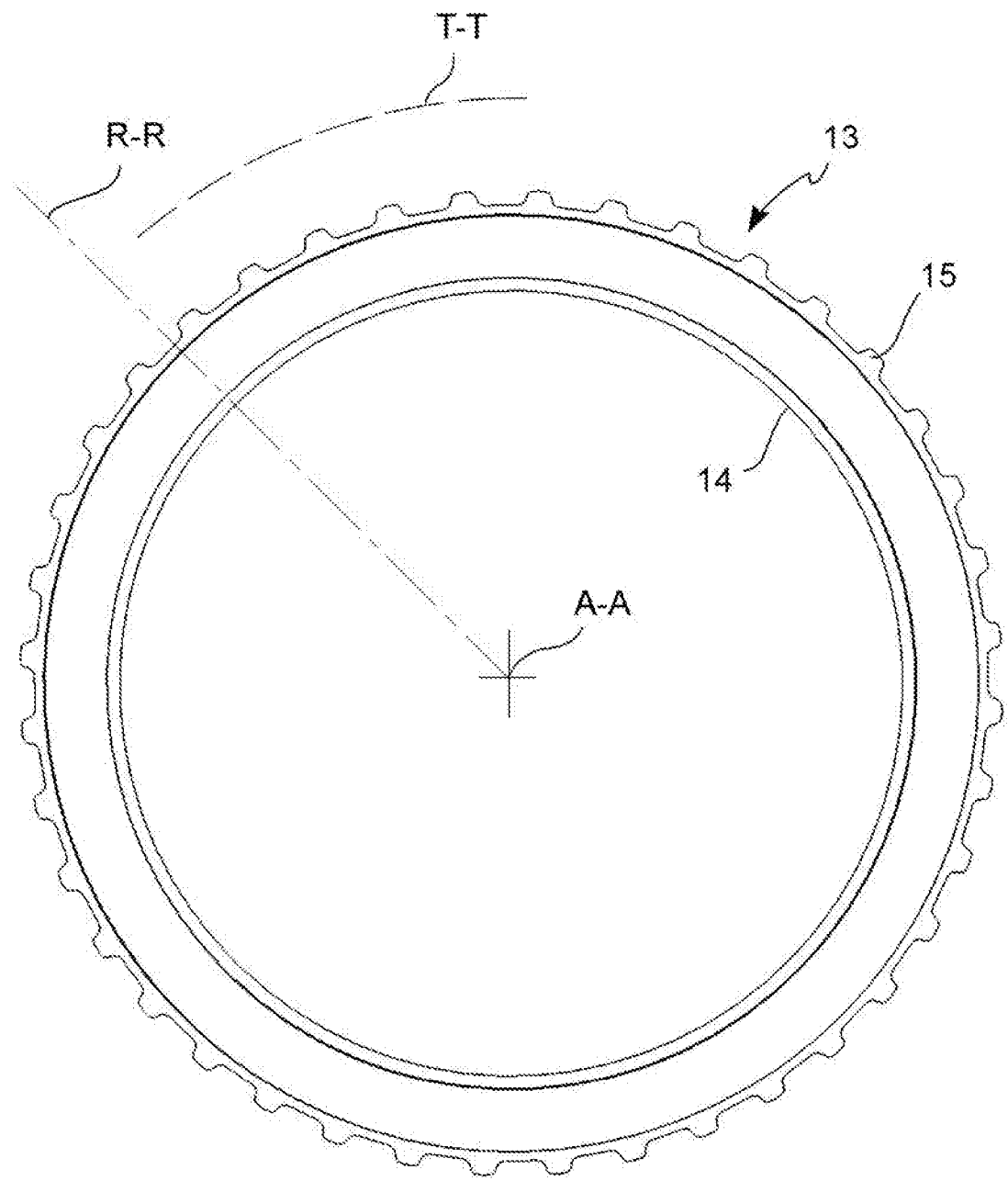
FIG. 12 shows a plan view of the ring of FIG. 10.

In accordance with a general embodiment, a disc brake disc with a parking brake cylindrical surface adapted to cooperate with shoes of a parking brake is indicated with reference numeral 1.

Said disc brake disc comprises a braking band 5. Said braking band 5 comprises at least opposite braking surfaces 6, 7 and a geometric connection portion of band 8 which connects said braking band 5 to a bell 9.

Said bell 9 comprises a connection plate 10 adapted to connect it to a wheel hub. Said bell 9 comprises an annular geometric connection portion of bell 11 for the geometric connection of the bell 9 to the geometric connection portion of band 8.

Said braking band 5 and said bell 9 are pieces separate from each other and geometrically coupled to each other by means of said geometric connection portions of band 8 and bell 11 so as to transfer the braking action exerted by a brake caliper on said opposite braking surfaces 6, 7 from said braking band 5 to said bell 9 and thus to said hub.

In accordance with an embodiment, the bell 9 or the braking band 5 comprise axial blocking prominences 16 blocking the braking band 5 in the direction A-A axial to the bell 9.

Said bell 9 comprises a bell connection surface 12 arranged opposite said braking band 5.

Advantageously, said disc brake disc 1 comprises a parking ring 13.

Said parking ring 13 comprises radially and internally, i.e. in the radial direction facing the axis of rotation of the disc brake disc 1, an inner portion of ring 14, radially and internally delimited by said parking brake cylindrical surface 2.

Said inner portion of ring 14 further comprises radially and externally, i.e. facing the opposite direction with respect to the axis of rotation of the disc brake disc 1, a ring connection portion 15.

Said parking ring 13 is in a separate piece from said bell 9 and said braking band 5.

Said ring connection portion 15 is coupled to said bell connection surface 12 to transfer the parking braking action exerted by the shoes 3, 4 against the parking brake cylindrical surface 2 to said bell 9 and thus to the vehicle hub.

In accordance with an embodiment, said bell 9 comprises a geometric bell connection surface 12 opposite said braking band 5.

In this embodiment, said parking ring 13 radially and externally comprises a geometric ring connection portion 15.

Said geometric ring connection portion 15 is geometrically coupled to said geometric bell connection surface 12 to transfer the parking braking action exerted by the shoes 3, 4 on the parking brake cylindrical surface 2 to said bell 9 and thus to the hub.

In accordance with an embodiment, said parking ring 13 has a transverse section, or cross-section in a plane comprising a radial direction R-R and an axial direction parallel to the axis of rotation A-A, "I" shaped, so that said ring connection portion 15 is connected to said inner portion of ring 14 by means of a neck portion of ring 16 extending in the axial direction A-A by less than the extension in the axial direction A-A of said geometric ring connection portion 15 and also than the extension in the axial direction A-A of said inner portion of ring 14.

In accordance with an embodiment, said bell 9 comprises a geometric bell connection surface 12 opposite to said braking band 5 which circumferentially forms a substantially uniformly distributed coupling.

In this embodiment, said parking ring 13 radially and externally comprises a geometric ring connection portion 15 which circumferentially forms a substantially uniformly distributed coupling.

Said geometric ring connection portion 15 is geometrically coupled to said geometric bell connection surface 12 to transfer the parking braking action exerted by the shoes 3, 4 on the parking brake cylindrical surface 2 to said bell 9 and thus to the hub.

In accordance with an embodiment, said geometric connection portions of band 8 and bell 11 form a shape geometric coupling which constrains said braking band 5 to said bell 9 at least in the radial R-R and tangential T-T directions to the brake disc 1.

In accordance with an embodiment, said geometric ring connection portion 15 and said geometric bell connection surface 12 form a shape geometric coupling which constrains said parking ring 13 to said bell 9 at least in the radial R-R and tangential T-T directions to the braking disc 1.

In accordance with an embodiment, said geometric connection portions of band 8 and bell 11 form a pair of radial toothings meshed with each other.

In accordance with an embodiment, said geometric ring connection portion 15 and said geometric bell connection surface 12 form a pair of radial toothings meshed with each other.

In accordance with an embodiment, said bell 9 is made of metal sheet, for example a steel metal sheet, of constant thickness and shaped at least to form said bell connection portion 11 and said bell connection surface 12.

In accordance with an embodiment, said parking ring 13 is in any of the following materials: steel or cast iron or aluminum or plastic or zamak.

In accordance with an embodiment, said parking ring 13 is obtained by sintering or casting or forging or molding or additive manufacturing.

In accordance with an embodiment, said parking ring 13 is blocked at said bell 9 by means of a weld or separate welding points or circumferentially and uniformly distributed separate welding points, or by riveting the ring connection portion 15 to the bell connection surface 12 or by interference, by radially deforming said ring connection portion 15 against said bell connection surface 12, or by gluing.

In accordance with an embodiment, said bell 9 is obtained by deep drawing a metal sheet and, at least the annular bell connection portion 11 thereof is obtained by radial deformation.

In accordance with an embodiment, said braking band 5 is obtained by casting.

In accordance with an embodiment, said parking ring 13 is obtained by molding or by sintering or by forging and said parking brake cylindrical surface 2 by chip removal, for example by turning, to form a surface 2 substantially coaxial with the axis of rotation of the disc brake disc 1.

A method of assembly of a disc brake disc 1 is described below.

Said method comprises at least the steps of:
  providing a braking band 5, a bell 9 and a parking ring 13 as described in any one of the embodiments previously presented;
  coupling said bell 9 to said braking band 5 by coupling to each other said connection portions of band 8 and bell 11;
  coupling said parking ring 13 to said bell 9 by coupling said ring connection portion 15 to said bell connection surface 12.

In accordance with an alternative method, said step of coupling the parking ring 13 to the bell 9 takes place before said step of coupling the braking band 5 to the bell 9.

In accordance with an alternative method, said step of coupling the braking band 5 to the bell 9 takes place by at least comprising the step of radially deforming said bell 9 against said braking band 5 so that said bell connection portion 11 matches said band connection portion 8.

The present invention also relates to a service and parking brake comprising a disc brake disc 1 as described in any one of the embodiments previously presented.

Those skilled in the art, in order to satisfy contingent and specific needs, may majorly modify and adapt the preferred embodiment of the disc described above, and replace elements with other functionally equivalent, without however departing from the scope of the following claims.

REFERENCES

1 Disc brake disc
2 parking brake cylindrical surface
3 shoe
4 shoe
5 braking band
6 first of the opposite braking surfaces
7 second of the opposite braking surfaces
8 geometric connection portion of band
9 bell
10 connection plate
11 annular geometric connection portion of bell
12 geometric bell connection surface
13 parking ring
14 inner portion of ring
15 geometric ring connection portion
16 axial blocking prominences
A-A axis of rotation
R-R radial direction orthogonal to the axis A-A
T-T circumferential direction orthogonal to A-A and R-R

The invention claimed is:

1. A disc brake disc with a parking brake cylindrical surface suitable for cooperating with shoes of a parking brake, wherein said disc brake disc comprises:
   a braking band comprising opposite braking surfaces and a geometric connection portion of the band connecting the braking band to a bell;
   said bell comprising a connection plate with a wheel hub and an annular geometric connection portion of the bell connecting the bell to the geometric connection portion of the band;
   said braking band and said bell being separate pieces from each other and geometrically coupled to each other by said geometric connection portion of the band and said geometric connection portion of the bell so as to transfer a braking action exerted by a brake caliper on said opposite braking surfaces from said braking band to said bell and thus to said wheel hub;
   said bell comprising a bell connection surface opposite to said braking band;
   and wherein
   said disc brake disc further comprises a parking ring wherein an inner portion of said parking ring is delimited in a radial direction by the parking brake cylindrical surface and wherein the parking brake ring is delimited in an external radial direction by a ring connection portion;
   wherein a radially outer surface of said parking ring only touches a radially inner surface of said bell, and a radially outer surface of said bell only touches a radially inner surface of said braking band so that said parking ring does not touch the braking band,
   said ring connection portion being coupled to said bell connection surface to transfer a parking braking action exerted by the shoes on the parking brake cylindrical surface to said bell and thus to the wheel hub.

2. The disc brake disc of claim 1, wherein
said geometric bell connection surface is opposite to said braking band;
said geometric ring connection portion is coupled geometrically to said geometric bell connection surface to transfer the parking braking action exerted by the shoes on the parking brake cylindrical surface to said bell and thus to the hub; and/or wherein
said parking ring has a transverse section, or cross-section in a plane comprising a radial direction and an axial direction, I shaped, so that said geometric ring connection portion is connected to said inner portion of ring by a neck portion of ring extending in the axial direction less than both the extension in the axial direction of said geometric ring connection portion and the extension in the axial direction of said inner portion of ring; and/or wherein
said bell comprises a geometric bell connection surface opposite to said braking band which circumferentially forms a substantially uniformly distributed coupling;
said parking ring comprises radially externally a geometric ring connection portion which circumferentially forms a substantially uniformly distributed coupling;
said geometric ring connection portion is coupled geometrically to said geometric bell connection surface to transfer the parking braking action exerted by the shoes on the parking brake cylindrical surface to said bell and thus to the hub.

3. The disc brake disc of claim 1, wherein
said geometric connection portion of band and said geometric connection portion of bell form a shape geometric coupling which constrains said braking band to said bell at least in radial and tangential directions to the brake disc;
said geometric ring connection portion and said geometric bell connection surface form a shape geometric coupling which constrains said braking band to said bell at least in the radial and tangential directions to the brake disc;
said geometric connection portion of band and said geometric connection portion of bell form a pair of radial toothings meshed with each other; and
said geometric ring connection portion and geometric bell connection surface form a pair of radial toothings meshed with each other.

4. The disc brake disc of claim 1, wherein
said bell is made of metal sheet of constant thickness and shaped at least to form said connection portion of bell and said bell connection surface;
said parking ring is made from any of the materials selected from the group consisting of: steel, cast iron, aluminium, plastic and zamak; and/or wherein
said parking ring is obtained by sintering, casting, forging, stamping or additive manufacturing.

5. The disc brake disc of claim 1, wherein
said parking ring is blocked to said bell by a weld or separate welding points or riveting points of the ring connection portion to the bell connection surface or by interference by radially deforming said ring connection portion against said bell connection surface or by gluing.

6. The disc brake disc of claim 1, wherein
said bell is obtained by deep drawing a metal sheet and, at least its annular bell connection portion is made by radial deformation; and/or wherein
said braking band is obtained by casting; and/or wherein
said parking ring is made by moulding, sintering or forging and said parking brake cylindrical surface is made by chip removal to form a surface substantially coaxial with the axis of rotation of the disc brake disc.

7. A method for assembling a disc brake disc, comprising the following steps:
- providing a braking band, a bell and a parking ring according to claim 1;
- coupling said bell to said braking band by coupling to each other said geometric connection portion of band and said geometric connection portion of bell; and
- coupling said parking ring to said bell by coupling said ring connection portion to said bell connection surface.

8. The method of claim 7, wherein said coupling step of the parking ring to the bell takes place before said coupling step of the braking band to the bell.

9. The method of claim 7, wherein said coupling step of the braking band to the bell takes place by radially deforming said bell against said braking band so that said geometric connection portion of bell matches said geometric connection portion of band.

10. A service and parking brake comprising a disc brake disc according to claim 1.

11. A disc brake disc with a parking brake cylindrical surface suitable for cooperating with shoes of a parking brake, wherein said disc brake disc comprises:
- a braking band comprising opposite braking surfaces and a geometric connection portion of the band connecting the braking band to a bell;
- said bell comprising a connection plate with a wheel hub and an annular geometric connection portion of the bell connecting the bell to the geometric connection portion of the band;
- said braking band and said bell being separate pieces from each other and geometrically coupled to each other by said geometric connection portion of the band and said geometric connection portion of the bell so as to transfer a braking action exerted by a brake caliper on said opposite braking surfaces from said braking band to said bell and thus to said wheel hub;
- said bell comprising a bell connection surface opposite to said braking band;
- and wherein said disc brake disc further comprises a parking ring wherein an inner portion of said parking ring is delimited in a radial direction by the parking brake cylindrical surface and wherein the parking brake ring is delimited in an external radial direction by a ring connection portion;
- wherein the bell separates the parking ring from the braking band so that the parking ring does not touch the braking band,
- said ring connection portion being coupled to said bell connection surface to transfer a parking braking action exerted by the shoes on the parking brake cylindrical surface to said bell and thus to the wheel hub.

* * * * *